United States Patent
Eakins

(10) Patent No.: US 10,546,057 B2
(45) Date of Patent: Jan. 28, 2020

(54) SPREADSHEET PROGRAM-BASED DATA CLASSIFICATION FOR SOURCE TARGET MAPPING

(75) Inventor: Christopher Eakins, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 472 days.

(21) Appl. No.: 13/283,757

(22) Filed: Oct. 28, 2011

(65) Prior Publication Data
US 2013/0110884 A1 May 2, 2013

(51) Int. Cl.
G06F 17/00 (2019.01)
G06F 17/24 (2006.01)

(52) U.S. Cl.
CPC .................. G06F 17/246 (2013.01)

(58) Field of Classification Search
CPC .. G06F 17/246; G06F 17/2247; G06F 17/272; G06F 17/2725; Y10S 707/99931; Y10S 707/99933; Y10S 707/99942; Y10S 707/99945
See application file for complete search history.

(56) References Cited

U.S. PATENT DOCUMENTS

| | | | | |
|---|---|---|---|---|
| 4,989,141 | A * | 1/1991 | Lyons et al. | 705/36 R |
| 6,049,878 | A * | 4/2000 | Caronni et al. | 726/3 |
| 6,605,122 | B1 * | 8/2003 | Hearn et al. | 715/236 |
| 6,631,497 | B1 * | 10/2003 | Jamshidi et al. | 715/205 |
| 6,701,485 | B1 * | 3/2004 | Igra et al. | 715/210 |
| 7,197,696 | B1 | 3/2007 | Muzumdar | |
| 7,640,493 | B2 | 12/2009 | Collie | |
| 7,685,133 | B2 * | 3/2010 | Sample et al. | 707/709 |
| 2002/0059425 | A1 * | 5/2002 | Belfiore et al. | 709/226 |
| 2002/0078086 | A1 * | 6/2002 | Alden et al. | 707/503 |
| 2003/0033317 | A1 * | 2/2003 | Ziglin | 707/102 |
| 2003/0050911 | A1 * | 3/2003 | Lucovsky et al. | 707/1 |
| 2003/0097485 | A1 * | 5/2003 | Horvitz et al. | 709/313 |
| 2003/0110191 | A1 * | 6/2003 | Handsaker | G06F 17/246 715/212 |

(Continued)

FOREIGN PATENT DOCUMENTS

AU 2005200999 B2 * 10/2005
CN 1604082 A 4/2005

(Continued)

OTHER PUBLICATIONS

Data Services in your spreadsheet, Saint-Paul et al, Proceedings of the 11th international conference on Extending database technology: Advances in database technology, pp. 690-694, 2008.*

(Continued)

Primary Examiner — Augustine K. Obisesan

(57) ABSTRACT

The subject disclosure relates to third party cloud schema matching to a user's data. The user can select the type of data to be looked up from an external source in order for the user's data to be augmented with data from the external source. The user can be presented with a list of service providers that support the selected type of data. Columns from the user's data are associated with supported lookup information types either automatically or manually. Based on the association, data from the external data source is automatically mapped to the user's data and updates are selectively applied to the user's data.

20 Claims, 10 Drawing Sheets

(56) References Cited

U.S. PATENT DOCUMENTS

| | | | |
|---|---|---|---|
| 2003/0126056 A1* | 7/2003 | Hausman et al. | 705/36 |
| 2003/0131069 A1* | 7/2003 | Lucovsky et al. | 709/217 |
| 2003/0217071 A1* | 11/2003 | Kobayashi et al. | 707/102 |
| 2004/0006590 A1* | 1/2004 | Lucovsky et al. | 709/203 |
| 2004/0172590 A1* | 9/2004 | Rothschiller et al. | 715/503 |
| 2004/0172592 A1* | 9/2004 | Collie et al. | 715/503 |
| 2005/0015732 A1* | 1/2005 | Vedula et al. | 715/805 |
| 2005/0022111 A1 | 1/2005 | Collet | |
| 2005/0034060 A1* | 2/2005 | Kotler et al. | 715/503 |
| 2005/0065952 A1* | 3/2005 | Dettinger | G06F 16/258 |
| 2005/0097447 A1* | 5/2005 | Serra et al. | 715/503 |
| 2005/0102303 A1 | 5/2005 | Russell | |
| 2005/0125781 A1* | 6/2005 | Swamy et al. | 717/144 |
| 2006/0004844 A1* | 1/2006 | Rothschiller et al. | 707/102 |
| 2006/0026137 A1* | 2/2006 | Sattler | G06F 17/246 |
| 2006/0075323 A1 | 4/2006 | Singh | |
| 2006/0090129 A1* | 4/2006 | Collie et al. | 715/513 |
| 2006/0112123 A1 | 5/2006 | Clark | |
| 2006/0161544 A1* | 7/2006 | Lee et al. | 707/6 |
| 2006/0212469 A1* | 9/2006 | Babanov et al. | 707/102 |
| 2006/0236306 A1* | 10/2006 | DeBruin et al. | 717/113 |
| 2007/0022128 A1* | 1/2007 | Rothschiller et al. | 707/100 |
| 2007/0061698 A1* | 3/2007 | Megiddo et al. | 715/503 |
| 2007/0061706 A1* | 3/2007 | Cupala et al. | 715/513 |
| 2007/0078873 A1* | 4/2007 | Avinash et al. | 707/101 |
| 2007/0203922 A1* | 8/2007 | Thomas | 707/100 |
| 2007/0204019 A1* | 8/2007 | Martynov et al. | 709/223 |
| 2008/0034281 A1* | 2/2008 | Handsaker et al. | 715/219 |
| 2008/0201234 A1* | 8/2008 | Castro et al. | 705/26 |
| 2008/0222507 A1* | 9/2008 | Nguyen et al. | 715/212 |
| 2008/0222508 A1* | 9/2008 | Nguyen et al. | 715/212 |
| 2009/0172553 A1* | 7/2009 | Sikka et al. | 715/733 |
| 2009/0327321 A1* | 12/2009 | McCormack et al. | 707/101 |
| 2010/0058169 A1* | 3/2010 | Demant et al. | 715/234 |
| 2011/0066602 A1* | 3/2011 | Studer | G06F 17/2264 707/690 |
| 2011/0099166 A1* | 4/2011 | Mugundan et al. | 707/736 |
| 2011/0161373 A1 | 6/2011 | Tangen | |
| 2011/0209048 A1 | 8/2011 | Scott et al. | |

FOREIGN PATENT DOCUMENTS

| | | | |
|---|---|---|---|
| CN | 101196927 A | | 6/2008 |
| EP | 351234 A2 | * | 1/1990 |
| EP | 294187 A3 | * | 7/1992 |
| EP | 1452974 A2 | * | 9/2004 |
| WO | WO 0013112 A1 | * | 3/2000 |
| WO | WO 02084522 A2 | * | 10/2002 |

OTHER PUBLICATIONS

Overview of Connecting (Importing) Data; Jun. 28, 2011.
Querying External Data in Excel; Jun. 28, 2011.
Getting started with ArcGIS; Jun. 27, 2011.
Rus Veronica Rozalia; Spreadsheet-based Decision Support Systems; Jun. 28, 2011.
Tim Walters, Incorporating External Data Into the Data Warehouse, Jun. 27, 2011.
PCT Application No. PCT/US2012/060170, International Search Report dated Mar. 29, 2013, 9 pages.
"Final Office Action Issued in Chinese Patent Application No. 201210419280.0", foreign counterpart to U.S. Appl. No. 13/283,757, dated May 27, 2016, 15 Pages.
Chinese Patent Application No. 2012101492800, Second Office Action dated Nov. 23, 2015 (foreign counterpart application to U.S. Appl. No. 13/283,757), 13 Pages (including English translation).
"First Office Action and Search Report Issued in Chinese Patent Application No. 201210419280.0", dated May 13, 2015, 16 Pages.
Chinese Patent Application No. 2012101492800, Amendment dated Sep. 28, 2015 (foreign counterpart application to U.S. Appl. No. 13/283,757), 11 Pages (including English translation of amended claims).
"Supplementary Search Report Issued in European Patent Application No. 12844594.7", (foreign counterpart application to U.S. Appl. No. 13/283,757, dated Jul. 29, 2015, 7 Pages.
Chinese Patent Application No. 2012101492800, Amendment dated Feb. 4, 2016, (foreign counterpart application to U.S. Appl. No. 13/283,757), 13 Pages (including English translation).
European Patent Application No. 12844594.7, Response to Communication, dated Feb. 24, 2016, (foreign counterpart application to U.S. Appl. No. 13/283,757), 13 pages.
Chinese Patent Application No. 201210419280.0, foreign counterpart to U.S. Appl. No. 13/283,757, Request for Reexamination dated Sep. 7, 2016, 14 Pages.
"Introducing Amazon QuickSight—YouTube", Retrieved from: https://www.youtube.com/watch?v=Tj0gW4Xl6vU, Retrieved on: Feb. 25, 2019, 2 Pages.

* cited by examiner

Select Service Provider and Map Columns ← 410

Select the type of data you wish to Lookup ← 420

Organizations and People including names, addresses, ... ▼

Select sheet containing data ← 430

Sheet 1 ▼

☑ First Row of Sheet Contains Column Names ← 440

Select Lookup Service Provider ← 450

External Service Provider Name ▶ ← 460

The lookup service provider needs to know what columns in your data to use, and what type of information is in those columns. Drag and drop the user columns on the appropriate information Type. Alternatively, select the user columns you wish to map, right click on them and select "Auto-Map".

Supported Lookup Information Types ← 480

☐ Name
☐ CustomerName
  ☐ OrganizationName
    customer_A
  ☐ PersonName
    ├ First
    ├ Middle
    ├ Last
    ├ SecondLast
    ├ Prefix
    └ Suffix

User Columns
customer_A
addr_B
cty_C
st_D
postal_E
ph_F ← 470

← 490
← 495

[Help]     [< Back] [Next >] [Finish >>|]  [Cancel]

| | A | |
|---|---|---|
| | customer | addr |
| 1 | | |
| 2 | Safety Bros. | 4747 |
| 3 | Magell Enterprises | 39 Sm |
| 4 | Irish Airc | 4041 |
| 5 | Debby's Office | 16059 |
| 6 | Clients First Ltd. | Unkno |
| 7 | Horizon Aeroplane | 1651 |
| 8 | John Smith | 7755 |
| 9 | Office Station | |
| 10 | CounterSpecs | 288 T |
| 11 | Acme Co. | 90 Inc |

FIG. 4

SPREADSHEET PROGRAM-BASED DATA CLASSIFICATION FOR SOURCE TARGET MAPPING

TECHNICAL FIELD

The subject disclosure generally relates to spreadsheet programs, e.g., to spreadsheet program-based data classification for source target mapping.

BACKGROUND

As computing technology advances and computing devices become more prevalent, the usage of computers for daily activities has become commonplace. For example, a person might utilize cloud data services in a cloud computing environment. Cloud computing can provide various computing capabilities (e.g., software, data access, storage services, and so forth) without a user (e.g. end-user) being aware of the physical location and/or configuration of the system that delivers the services.

Further, users of spreadsheet programs maintain tabular sets of data on spreadsheets. Frequently, users would like to correct, improve, and/or augment the data in their spreadsheet through interaction with external data sources (e.g., for advertising purposes, for updated information for various purposes, and so forth). However, the spreadsheet program data set schemas (e.g., the organization of data with the spreadsheet) might not be the same as the data set schemas of the external data sources. However, the spreadsheet program data set schemes and the data set schemas of the external data sources may have attributes that share corresponding and/or similar information semantics.

In order for spreadsheet program users to identify and use external data, the external data sets are manually analyzed to determine how such data sets may map to the data set for the spreadsheet program. Further, any transfer of information from the external set to the spreadsheet program data is performed manually or a process for mapping the information and performing the transfer is created manually. This is time consuming, can be frustrating, and adds expense to the process of updating, correcting, augmenting, and so forth, data within the spreadsheet.

The above-described deficiencies of today's computing systems and spreadsheet programs are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Aspects disclosed herein relate to service schema matching and third party cloud schema matching to a user's data. External data sets can be mapped or marked up to classify their attributes into standard information types. Within a spreadsheet application, a user can classify attributes of their spreadsheet-based data sets. The classification allows automatic processes to be performed. Such processes include automatically corresponding external data source and data set detection, spreadsheet data set to external data set unions and joins, automatic value and entity matching, and information transfers to improve the quality of the spreadsheet based data set.

These and other embodiments are described in more detail below.

BRIEF DESCRIPTION OF THE DRAWINGS

Various non-limiting embodiments are further described with reference to the accompanying drawings in which:

FIG. 4 illustrates a schematic representation of an exemplary prompt that can be provided to the user to facilitate spreadsheet program-based data classification for source target mapping, according to an aspect;

DETAILED DESCRIPTION

Overview

Figure 1:
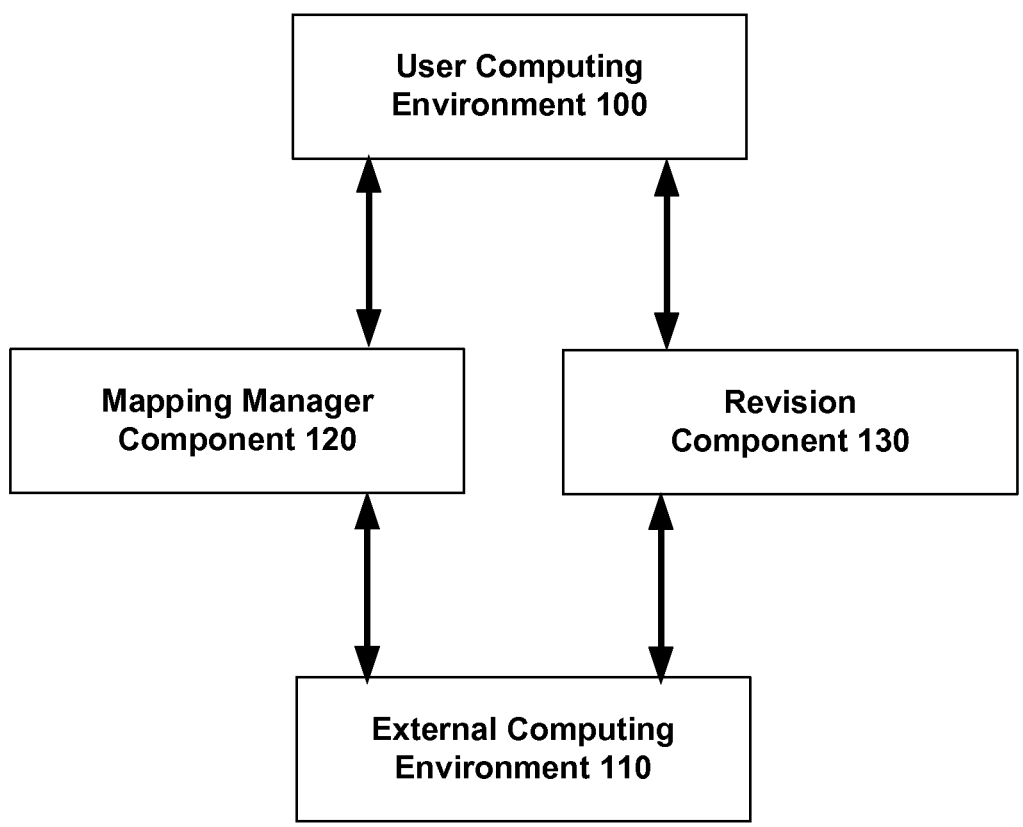
FIG. 1 illustrates a block diagram of an exemplary computing system, according to an aspect.

The disclosed aspects provide a means to map or mark up external data sets (e.g., manually or automatically) to classify their attributes into standard information types. Within the spreadsheet application, a user can perform the same or a similar function for their own data spreadsheet-based data sets (or the function can be performed automatically). Once the attributes are classified, other automatic processes can be performed. Such automatic processes include automatically corresponding external data providers and data set detection, spreadsheet data set to external data set unions and joins, automatic value and entity matching, and information transfers for the purposes of improving the data quality of the spreadsheet-based data set.

An aspect relates to a system comprising a mapping manager component and a revision component. The mapping manager component is configured to perform an automatic correlation between a user spreadsheet schema associated with a user computing environment and a data service schema associated with an external computing environment. The revision component is configured to transfer data between the external computing environment and the user computing environment.

In an example, the mapping manager component is further configured to automatically analyze user data and external data to determine a mapping between the user spreadsheet schema and the data service schema.

In another example, the revision component is further configured to automatically apply value and entity matching during the data transfer. According to another example, the revision component is further configured to perform at least one of a union or a join during the data transfer.

The system, in an example, includes a column identifier component configured to identify columns in the user spreadsheet schema used for the data transfer. Further to this aspect, the system includes a column recognition component configured to determine a type of information contained in the identified columns.

The system, according to another example, includes an aggregation component configured to perform one or more of a union or a join on the data contained in the user computing environment during the data transfer. According to another example, the system comprises an analysis component configured to flag data contained in the user computing environment but not included in the data being transferred. In a further example, the system includes an external source classifier configured to identify one or more external sources that contain the same or similar information as the information contained in the user computing environment.

In a further example, the system comprises an interface component configured to display a prompt that requests information used by the mapping manager component to perform the matching.

In another example, the mapping manager component performs the automatic correlation based on information types supported by the external computing environment. According to another example, the mapping manager component performs the automatic correlation on the data service schema associated with a service application programming interface contained in the external computing environment.

According to an aspect is a method that includes receiving an indication of lookup information types supported by an external data service and obtaining identification and lookup information types for columns contained in the user data. The method also includes automatically mapping the columns to data associated with the lookup information types supported by the external data service. Further, the method includes transferring external data from the external data service to a user spreadsheet environment based on the mapping.

In an example, obtaining the identification and lookup information types includes sending a request for a type of data for lookup and receiving a selection of the user data. Further to this example, the method includes determining at least one external data service that supports the lookup information types and displaying a list of lookup information types supported.

In an example, transferring the data includes deleting duplicate data. In another example, transferring the data includes performing a union or a join on the transferred data and the user data. In a further example, transferring the data includes automatically applying value and entity matching during the data transfer. The method, according to another example, includes identifying data contained in the user data but not contained in the transferred data.

Another aspect relates to a computer-readable storage medium comprising computer-executable instructions stored therein that, in response to execution, cause a computing system to perform operations. The operations include identifying columns in a user spreadsheet schema associated with a user computing environment and determining a type of information contained in the identified columns. The operations also include performing automatic mapping between the user spreadsheet schema and a data service schema associated with an external computing environment and selectively transferring data between the external computing environment and the user computing environment. In an example, the operations can also include automatically analyzing user data and external data to determine a mapping between the user spreadsheet schema and the data service schema.

Herein, an overview of some of the embodiments for achieving service schema matching has been presented above. As a roadmap for what follows next, various exemplary, non-limiting embodiments and features for service schema matching are described in more detail. Then, some non-limiting implementations and examples are given for additional illustration, followed by representative network and computing environments in which such embodiments and/or features can be implemented.

Spreadsheet Program-Based Data Classification for Source Target Mapping

By way of further description with respect to one or more non-limiting ways to provide data classification for source target mapping in a spreadsheet program, a block diagram of an exemplary computing system is illustrated generally by FIG. 1. The exemplary computing system is configured to map external data sets to classify their attributes into standard information types and to allow a user to classify attributes of a personal spreadsheet-based data set. The exemplary computing system also performs automatic processes, such as automatic external data provider and data set detection, spreadsheet data set to external data set unions and joins, automatic value and entity matching, and information transfers for improving the data quality of the spreadsheet based data set. In an example, user spreadsheet data can be transferred to services, which allows the services to directly augment and pass back data to the user spreadsheet.

According to some aspects, mapping can be performed to communicate the existence of data (associated with a first user) to a service for purposes of data discoverability for other users. The service can broadcast to other users that the first user's spreadsheet data is known and is available for access, which can be beneficial if the first user is an expert, has better data, has additional information, or for other reasons. Further, the service can broadcast the type of data available in the first user's spreadsheet that another service can use and propagate to others. For example, such mapping can be utilized in an enterprise where data sets are shared, but are not widely known. Thus, the information classification and mapping can further facilitate information sharing through these services.

The computing system illustrated in FIG. 1 includes a user computing environment 100 and a non-user or external computing environment 110. In an example, the user computing environment 100 can include a user defined spreadsheet program. Many spreadsheet programs provide spreadsheets that contain columns and rows with generic labeling.

For example, the columns can be labeled with letters of the alphabet (e.g., "A", "B", "C", "D", "E", "F", "G", and so forth) and the rows can be labeled numerically (e.g., "1", "2", "3", "4", "5", "6", and so on). Although this generic labeling can apply to many situations and can be useful, there are other situations where the user desires to personalize the spreadsheet program. For example, the user might label the columns (or rows) with identifying information of the elements that are contained in that column (or row). For example, a spreadsheet program related to accounts receivable can include the column headings "invoice number", "invoice date", "invoice amount", "collections amount", "collections date", and "balance due". Another example of column headings for a customer database include "customer name", "address", "city", "state", "zip code", and "phone number". Thus, the user defined spreadsheet program can include user-defined spreadsheet schemas. For example, a schema can be customer names organized in the column titled "customer name".

The external computing environment 110 can include external data that can be utilized to augment the data contained in the user-defined spreadsheet program. Included in the external data are data service schemas, which are the service schemas supported by the external computing environment 110. According to an aspect, the data included in the user computing environment 100 can be corrected, improved, updated, augmented, and so on, through interaction with external data sources contained within the external computing environment 110.

The external data sources can be, for example, commercial data sources that routinely gather or collect information related to a variety of topics. For example, the commercial data sources can collect information related to customers (e.g., of a grocery chain) and their shopping habits. In another example, commercial data sources can collect information related to organizations (e.g., associated with a particular industry) and the executives, employees, customers, sales history, and so on of each organization. In a further example, commercial data sources might collect information related to people that attend tradeshows and the booths visited at the tradeshows. There are numerous other types of data gathering and all such types can be utilized with the disclosed aspects. Further, although discussed with respect to commercial data sources, the external computing environment 110 can relate to non-commercial data sources, according to an aspect.

It is to be understood that any data gathering is conducted after authorization from the person or organization being tracked has been explicitly (or in some cases implicitly) received. For example, the customer (or organization through an authorized individual) can agree to share personal as well as non-personal information and can be presented with one or more opportunities to opt-out of the collection of data. In some aspects, the person or organization has to take an affirmative action before the data is collected. According to other aspects, the person or organization can take an affirmative action to prevent the collection of data before that data is collected, which prevents such data collection. It is also contemplated herein that the data is collected from an external source that has received either express or implied consent for the collection of data. Further, the data collected and retained in the internal computing environment is data that the user or owner of the spreadsheet has collected, with express or implied consent. Thus, the disclosed aspects are not related to the collection of data but the mapping of such data, and more specifically, service schema matching between different entities (or the same entity that uses multiple spreadsheets and/or multiple schemas).

Also included in the exemplary computing system is a mapping manager component 120 configured to perform an automatic correlation between the user spreadsheet schemas (e.g., user computing environment 100) and the data service schemas (e.g., external computing environment 110) as well as service interfacing schemas. The correlation allows for automatic analysis of the external data (and in some cases the user data) to determine how the external data schemas map to the user spreadsheet schemas. Based on the analysis, information from the external data can be dynamically transferred (or copied) to the user spreadsheet schemas. In such a manner, a user can take advantage of the external data without manually reviewing the external data for matching data and then manually copying the information into the user spreadsheet. Thus, the disclosed aspects can reduce costs and save time as well as other functions that can be performed automatically.

According to some aspects, mapping component 120 is configured to perform one-to-one matching where each column is compared to another column (e.g., a column in the user spreadsheet is compared to a column in an external data). In according with some aspects, mapping component 120 is configured to perform one-to-many column matching. For example, a single column in the user spreadsheet is compared to two or more columns in the external data. Alternatively, two or more columns in the user spreadsheet are compared to a single column in the external data. According to another example, two or more columns in the user spreadsheet are compared to two or more columns in the external data. The one-to-one column matching and/or one-to-many column matching can result in auto concatenation and/or auto-parsing, in accordance with various aspects discussed herein.

Also included in the exemplary computing environment is a revision component 130 configured to transfer data between the external computing environment 110 and the user computing environment 100. The transfer of data is based on the schema matching performed by mapping manager component 120. For example, revision component 130 can compare the data from the external computing environment 110 (e.g. commercial database, another user database, and so forth) with the data in the user computing environment 100 (e.g., user database, user spreadsheet, and so on). If the data is contained in both (e.g., duplicate), the data is not imported into the user spreadsheet. If the data is included in the user spreadsheet but not the external spreadsheet, the data can be automatically deleted or flagged (for further analysis by a database administrator, for example) by revision component 130. If the data is included in the external spreadsheet, but not the user spreadsheet, the data can be added to the user spreadsheet. For example, the data can be imported into the user spreadsheet from the service (s). In another example, the data within the user spreadsheet can be exported or transferred to the service(s), where the service(s) augment the user data and pass back the data to the user spreadsheet.

In accordance with some aspects, revision component 130 is configured to analyze the data in the respective spreadsheet and make a determination of how to handle the data. For example, if a column relates to "Organization" the other fields in the row can be compared (e.g., between the user spreadsheet and the external spreadsheet) to determine if one or more values has changed (e.g., address, phone number, Internet domain, and so forth). Thus, the disclosed aspects can provide automatic value and entity matching, according to an aspect.

The deletion, flagging, adding of data, and other functions (e.g., joins, unions, value and entity matching, and so on) can be based on configurable parameters (e.g., user preferences, prompt sent to user requesting how to handle the data, and so on) or other parameters (e.g., historical handling of the data, and so on). Thus, the disclosed aspects can be configured to dynamically perform spreadsheet program-based data classification for source target mapping, according to an aspect.

In an example, Bob would like to update the data in his spreadsheet by finding external data that might be used to make his own spreadsheet-based data more comprehensive and accurate. Bob can open a form from a menu in his spreadsheet that lists the columns in his data set. The menu allows him to select a data domain from a drop-down menu (or other type of menu) in order to specify that his data set is related to a particular domain. The domain can be a well-known domain, a generic domain, an industry identified domain, and so forth.

As a function of selecting the data domain, Bob can be provided with a list or other identification of external providers that service the selected data domain. Bob can select one or more external providers from the list and can be presented with standard information types known within that domain that are supported by the provider. Bob can then select (e.g., drag) any column(s) from his own data set onto the well-known or generic information type for the domain to identify the type of data contained within his data set. In an example, the menu, drop-down menu, list, and so forth are presented or output in a visual format on a display. However, the disclosed aspects are not so limited and other means of presenting data to the user in a perceivable format (e.g., visual, audible, and so on) can be utilized.

In an embodiment, the computing system illustrated by FIG. 1 can differ in operation from conventional computing systems in order to provide additional benefits over those achievable by computing systems that employ data matching. For instance, the computing system disclosed herein can perform service schema matching. In an example, third party cloud schema can be mapped to a user's data.

Figure 2:
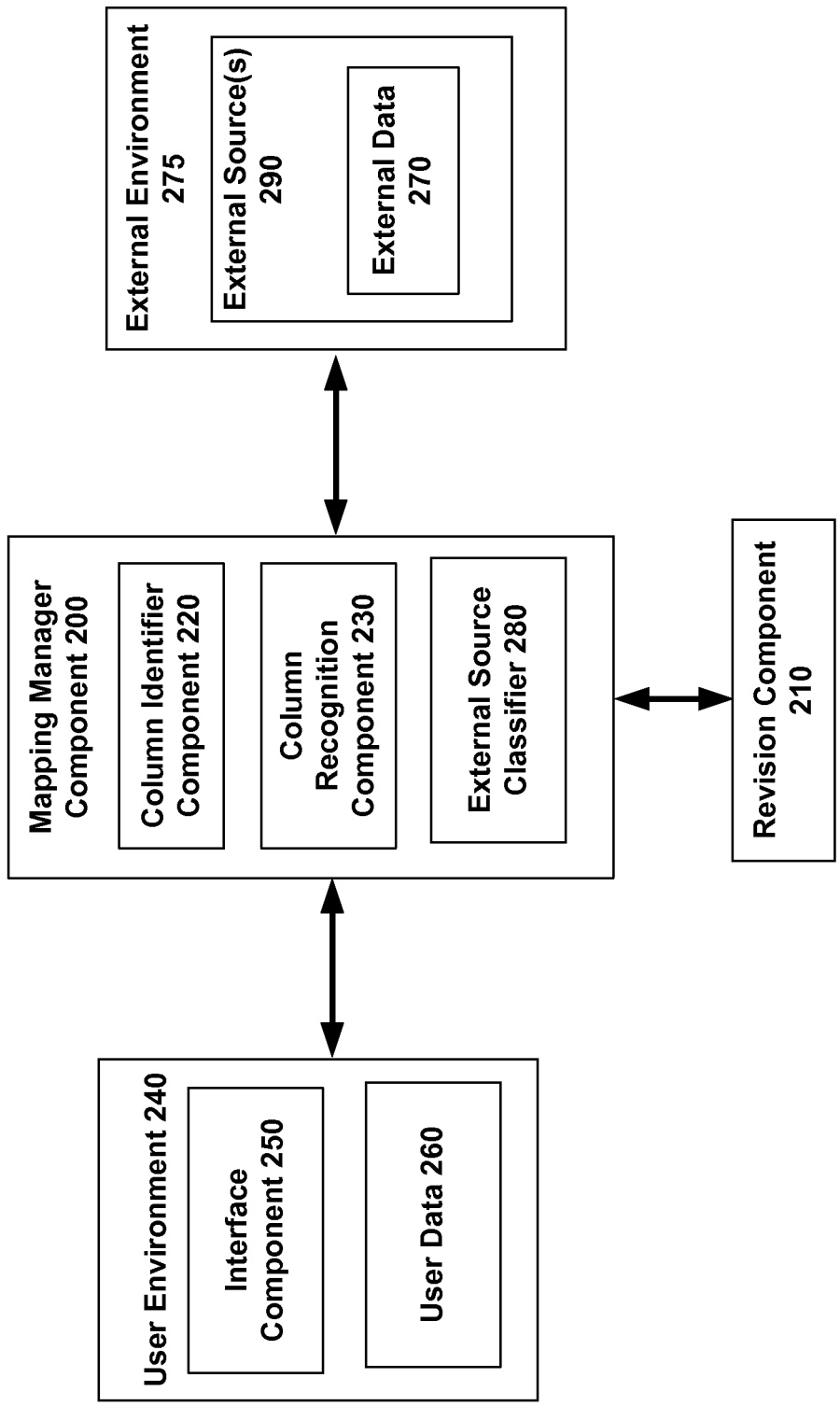
FIG. 2 is a block diagram showing a mapping manager component containing a column identifier component, a column recognition component, and an external source classifier, according to an aspect.

FIG. 2 is a block diagram showing a mapping manager component 200 containing a column identifier component, a column recognition component, and, an external source classifier, according to an aspect. The mapping manager component 200 is configured to perform an automatic correlation between a user spreadsheet schema associated with a user computing environment and a data service schema associated with an external computing environment. In accordance with some aspects, the mapping manager component performs the automatic correlation on a data service schema associated with a service application programming interface contained in the external computing environment. The mapping manager component 200 is operatively connected to a revision component 210 configured to transfer data between the external computing environment and the user computing environment.

Figure 3:
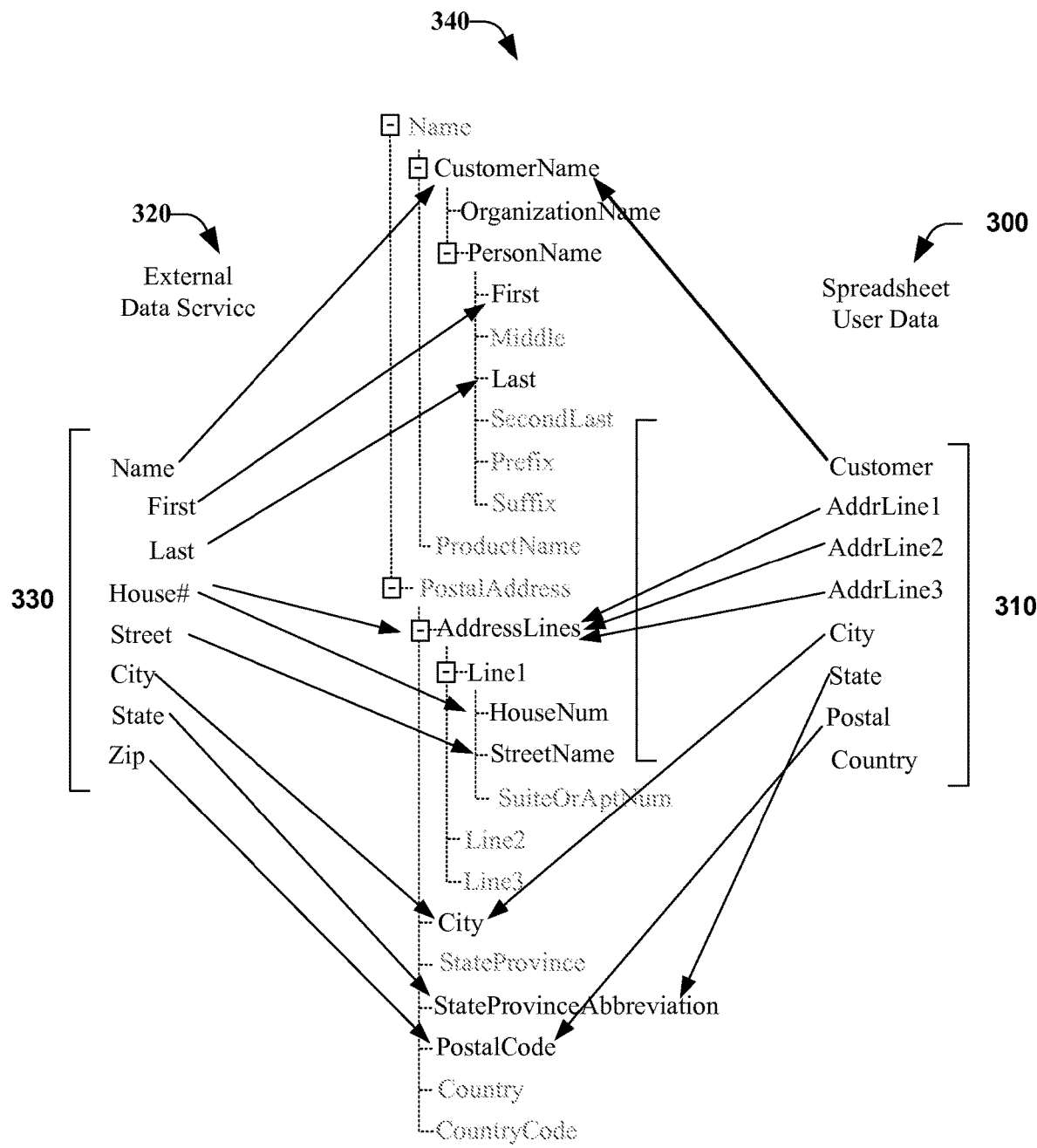
FIG. 3 illustrates an exemplary schematic representation of data lookup service mapping, according to an aspect.

Included in mapping manager component 200 is a column identifier component 220 configured to identify columns in the user data that are to be used for the data transfer. The identified columns can be utilized for one-to-one matching and/or one-to-many matching, according to an aspect. For example, FIG. 3 illustrates an exemplary schematic representation of data lookup service mapping, according to an aspect. Illustrated on the right are user spreadsheet data 300 and domains associated with the user spreadsheet data 300. As illustrated the domains (referred to collectively as user domains 310) include "Customer", "AddrLine1", "AddrLine2", "AddrLine3", "City, "State" "Postal", and "Country". The column identifier component 220 is configured to identify these domains automatically or based on received data (e.g., data entered manually by a user).

According to some aspects, column identifier component 220 receives an indication (e.g., from a user) of the domains or columns that are to be used for the updating of data. In some aspects, column identifier component 220 can automatically choose columns for which external data is to be retrieved. The automatic identification can be in place of a manual entry by the user or in addition to the manual entry of information. The column identifier component 220 can make the choice based on various parameters including user preferences, whether that column (or columns) was previously chosen (or not chosen) for external data augmentation, or based on other criteria (e.g., columns for which data is automatically populated by the spreadsheet program, columns containing mathematical formulas, and so forth).

Also included in mapping manager component 200 is a column recognition component 230 configured to determine the type of information that is contained in the identified columns. In accordance with some aspects, the column recognition component 230 can be configured to automatically determine the type of information contained in the identified columns. The automatic information type determination can be in addition to, or in place of, the manual entry by the user. For example, the column recognition component 230 can be configured to analyze the user data in the spreadsheet and make a determination that headers are included. This analysis by column recognition component 230 can include reviewing the data contained in the first row of the spreadsheet and comparing the first row with other rows in the spreadsheet. If the first row and other rows do not have duplicate contents, it can be inferred by column recognition component 230 that the first row is a header row and contains user identifying information.

For example, if the first row of the column is "state" and the other rows in the column include other words (e.g., "Tennessee", "Kentucky", "Florida" "Oregon", and so forth), then it is inferred by column recognition component 230 that the first row contains the heading. If, on the other hand, the first row in the column is "Oregon" and another row in that same column includes "Oregon", then it is inferred by column recognition component 230 that the first row is not a header row and that information is to be solicited from the user to determine the type of information contained in that column.

In another example, column recognition component 230 is configured to infer that the first row is a column heading based on analysis of the meaning of the term (e.g., word, phase, and so forth) contained in the first row. For example, if the first row contains the phrase "Residence City" or "First Name", column recognition component 230 can parse the phrase into words (or perform an analysis on the entire phrase) to make a determination whether the phase (individual words or other entry) indicates a broad category and qualifies as a column heading. If there is uncertainty or if the determination is that the term does not indicate a broad category, then the column recognition component 230 can solicit information from the user to determine the type of information contained in the column. In an example, if the first row in a column includes the word "Shawn", the column recognition component 230 can determine that the word does not refer to a broad category and, therefore, that the first row is not a column heading. In this case, the user would be prompted for information related to the category in which each column is to be categorized.

In some aspects, at least a portion of the mapping manager component 200 the column identifier component 220, and/or the column recognition component 230 can be contained within a user environment 240. For example, the portion of the mapping manager component 200, the column identifier component 220, and/or the column recognition component 230 can be associated with an interface component 250. The interface component 250 can be configured to present various information to the user (e.g. in any perceivable format) and receive, from the user, various data or other criteria associated with contents of the spreadsheet, as well as other data. For example, the interface component 250 can be configured to display a prompt (e.g., the prompt of FIG. 4) that allows the user to provide information used by mapping manager component 200 to perform the matching between user data 260, contained in the user environment 240, and external data 270 contained in an external environment 275.

The interface component 250 can provide a graphical user interface (GUI), a command line interface, a speech interface, Natural Language text interface, and the like. For example, a GUI can be rendered that provides a user with a region or means to load, import, select, read, and so forth, various requests and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Also included in mapping manager component 200 is an external source classifier 280 that is configured to identify one or more external sources 290 that contain the same or similar information as the information contained in the user environment 240. For example, based on the analysis performed by column identifier component 220 and/or column recognition component 230, the external source classifier 280 can provide a listing of the one or more external sources 290 that can support the information types for the user data. The user can select one of the external sources. In accordance with some aspects, the external source classifier 280 can automatically select one of the external sources. For example, if there is only one external source that supports the lookup information types, that external source can automatically be presented to the user. In some aspects, an external source might automatically be applied based on historical considerations (e.g., the same or a similar user spreadsheet utilized a particular source in the past), user preferences (e.g., if source B and D are available, use source D), and so forth.

Referring again to FIG. 3, illustrated on the left is an external data service 320. The domains supported by the external data service 320 (referred to collectively as data service domains 330) include "Name" (comprising subdomains "First" and "Last"), "House#", "Street", "City", "State", and "Zip". In some aspects, the external data schema associated with the external data service can include "CompanyName", "FirstName", "LastName", "MiddleName", "Address", "HouseNumber", "Street", "City", "State", and "PostalCode".

A straight comparison (e.g., exact matching) of the user domains 310 and the data service domains 330 illustrates that only "City" and "State" can be directly matched based on naming convention alone. Thus, if a naming convention technique is utilized, it would be difficult to automatically detect an association between the user domains 310 and the data service domains 330 since the naming conventions might not exactly match. Thus, in order to use the data from the external data service 320 for the user spreadsheet data 300, the data would be matched manually. However, the aspects disclosed herein can automatically perform the matching based on classification of attributes associated with the user spreadsheet data 300 and the external data service 320. Further, the various aspects disclosed herein can provide information related to supported lookup information types 340.

With continuing reference to FIGS. 2 and 3, the external source classifier 280 is configured to retain information related to the data service domains 330 and the association of those data service domains 330 with supported lookup information types 340. As illustrated in FIG. 3, "Name" (of the data service domains 330) is associated with "Customer Name" (of the supported lookup information types 340) and "House#" (of the data service domains 330) is associated with "HouseNum" (of the supported lookup information types 340). Each lookup information type that is supported is identified in some manner. In the example of FIG. 3, the supported lookup information types are in dark lettering and the lookup information types not supported by the particular external data service 320 are in lighter lettering. However, other means of identifying the supported lookup information types can be utilized in accordance with the disclosed aspects.

In an example of the user manually providing the information to the column recognition component 230, a user can be presented with the supported lookup information types 340 list and can identify the information type to which each domain is most closely related. In this example, "Customer" (of the user domains 310) is indentified with "Customer Name" (of the supported lookup information types 340) and the three address lines ("AddrLine1", "AddrLine2", and "AddrLine3" of the user domains 310) are identified with "Address Lines" (of the supported lookup information types 340). Further, "City" is identified with "city", "State" with "StateProvinceAbbreviation", and "Postal" with "Postal Code". As illustrated, "Country" is not a supported lookup information type in this example.

In a similar manner, the external origination (or person(s)) that own the external data service) can manually identify the information type each domain is most closely related to and this identification can be captured by external source classifier 280. In this example, "Name" is identified with "Customer Name", "First" with "Person Name—First", and "Last" with "Person Name—Last". Further, "House#" is identified with "Address Lines" and with "HouseNum" and "Street" is identified with "StreetName". Further, "City" is identified with "City", "State" with "StateProvinceAbbreviation", and "Zip" with "Postal Code".

Based on this matching, revision component 210 is configured to automatically apply value and entity matching during the data transfer. According to some aspects, revision component 210 is further configured to perform at least one of a union or a join (e.g., combine records from two or more tables in a database) during the data transfer. In some aspects, revision component 210 is configured to delete data (e.g., if the data contained in the user spreadsheet is obsolete). Further, revision component 210 is configured to perform cleansing of the data (e.g., value matches), perform a look-up service, and/or a similarity sort (e.g., search for duplicates), as well as other functions.

FIG. 4 illustrates a schematic representation of an exemplary prompt that can be provided to the user to facilitate spreadsheet program-based data classification for source target mapping, according to an aspect. For example, the prompt can be output to the user by an interface component (e.g., interface component 250 of FIG. 2).

As illustrated, the user can be using a spreadsheet 400, and can be presented with a pop-up window 410 that allows the user the opportunity to select a service provider and map columns from the user's spreadsheet data to the external data source. Therefore, the pop-up window 410 can obtain information that can be utilized to provide automatic-mapping between an external data source and user spreadsheet data.

The pop-up window 410 can allow the user to select the type of data that is to be looked up, at 420. In this example, the selection is "Organizations and People including their names, addresses, phones, web sites, and email". The user also selects the sheet (from the spreadsheet program) that contains the data 430. In this case, "Sheet1" was selected. The user might also be provided the option, at 440, of identifying whether the first row of the sheet contains column names. For example, the columns might be identified with generic column names (e.g., "A", "B", "C", "D", and so forth). The user might also use the first row to provide information related to the content contained in each row (e.g., "customer", "addr", "cty", and so on) so that the data is easier for the user to understand.

The user can also select the lookup service provider 450 (e.g., external data source). In some aspects, based upon the type of data the user selects for lookup, at 420, a dropdown menu or other means for the user to select the external data source or lookup service provider 450 is dynamically presented. Thus, if there is a change made to the selection of the type of data to be looked up, at 420, one or more lookup service providers 450 that can be selected might also change.

The user can also be presented with details related to the purpose of the window. For example, at 460, the exemplary prompt notifies the user:

"The lookup service provider needs to know what columns in your data to use, and what type of information in those columns. Drag and drop the user columns on the appropriate information Type. Alternatively, select the user columns you wish to map, right click on them and select "Auto-Map"."

In the lower half of the window, the user is presented, on the left side, the user columns 470, which correspond directly to the spreadsheet 400. In this example, the user column headings-related generic column heading are "customer_A" (which indicates that "customer" is related to generic column "A"), "addr_B", "cty_C", "st_D", "postal_E", and "ph_F".

On the right side is a listing of the supported lookup information types 480. Illustrated is a link 490 between "customer_A" and "OrganizationName". Thus, the user has linked his customer column with the Information Type "OrganizationName" associated with the external data source. Other user columns are linked to supported lookup information types, as noted by the links 495.

Figure 5:
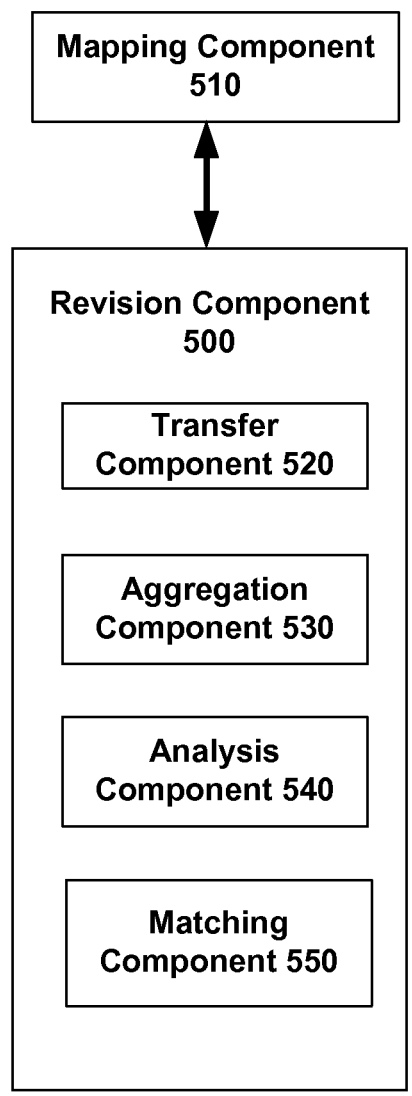
FIG. 5 illustrates a revision component containing a transfer component, an aggregation component, an analysis component, and a matching component, according to an aspect.

FIG. 5 illustrates a revision component 500 containing a transfer component, an aggregation component, an analysis component, and a matching component, according to an aspect. According to an aspect, a mapping component 510 is configured to perform an automatic correlation between a user spreadsheet schema associated with a user computing environment and a data service schema associated with an external computing environment.

After successful correlation by the mapping component 510, the revision component 500 is configured to transfer data between the external computing environment and the user computing environment. For example, a user might desire to query an application program interface associated with an external data source. However, the application program interface is for a specific purpose, which can be lookup or a different purpose. Further, the application program interface might have a different signature, which is a signature of the method call associated with the application program interface. Thus, different application program interfaces can have different signatures for different operations. The schematics from those signatures (e.g., operations) can be mapped to the data contained in the user's data.

The data transfer can be facilitated by a transfer component 520 that is configured to selectively perform one or more functions on the data at about the same time as the data is transferred. Such functions can include unions, joins, value and/or entity matching, and other functions that can improve the data quality of the spreadsheet based data set associated with the user computing environment.

To facilitate the functions associated with the data transfer, revision component 500 includes an aggregation component 530 that is configured to perform one or more of a union or a join on the data located in the user spreadsheet and the data from the external data source. For example, the aggregation component 530 is configured to combine records from two or more tables in a database, where a first table can be the user table and the second table is a table from an external data source. The combination of records can be based on a one-to-one column mapping, a one-to-many mapping, or combinations thereof.

In accordance with some aspects, aggregation component 530 can combine the data if the combination would not create a duplicate. For example, if the data is contained in both the user spreadsheet and the external data source (e.g., duplicate), the data is not imported into the user spreadsheet or is not directly augmented into the user data at the service in the case where the user spreadsheet data is transferred to the service(s). If the data is included in the external spreadsheet, but not the user spreadsheet, the data can be added to the user spreadsheet, according to an aspect.

Also included in revision component 500 is an analysis component 540 configured to analyze whether the data is already included in the user spreadsheet but not the external spreadsheet. If this is the case, the data can be automatically deleted or flagged by the analysis component 540. For example, the analysis component 540 can review the data included in the user spreadsheet and determine whether there is similar (or the same) data being transferred from the external data source. If one or more rows from the user's database does not have similar data arriving from the external data source, the analysis component 540 flags the data in the user database (e.g., it can indicate that the data in the user's database is to be deleted). Further, analysis component 540 can be configured to analyze whether the data is included in the external spreadsheet or service but not included in the user spreadsheet.

Also included in revision component 500 is a matching component 550 that is configured to analyze the data in the respective spreadsheet and make a determination of how to handle the data (e.g., is the data to be updated or not updated?). For example, if a column relates to "Organization" the other fields in the row can be compared (e.g., between the user spreadsheet and the external spreadsheet) to determine if one or more values has changed (e.g., address, phone number, Internet domain, and so forth). Thus, the disclosed aspects can provide automatic value and entity matching, according to an aspect.

Figure 6:
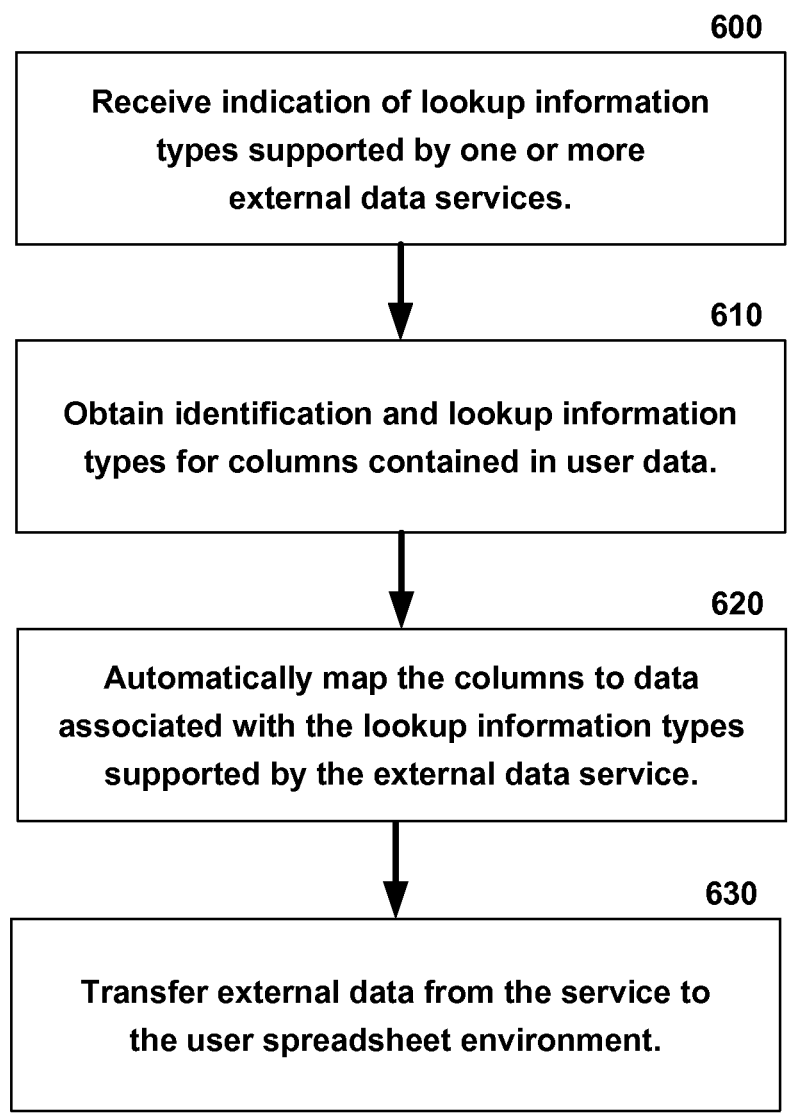
FIG. 6 illustrates a non-limiting flow diagram of a method for source target mapping, according to an aspect.

FIG. 6 illustrates a non-limiting flow diagram of a method for source target mapping, according to an aspect. At 600, an indication of lookup information supported by one or more external data services is received. The lookup information supported by the one or more external data service can be retained in a data store, for example. In an example, the lookup information supported can be received at substantially the same time as an external data service publishes the lookup information it supports. In some aspects, the lookup information supported by an external data service can change over time and, thus, the information retained in the data store, for example, can be updated with the new information.

At 610, identification and lookup information types for columns contained in user data is obtained. For example, the identification can be an identification of the columns in a user spreadsheet for which data is desired from an external data source. The lookup information types can be a cross-reference between the columns and look up information types supported by a selected external data source, according to an aspect.

The columns are automatically mapped to data associated with the lookup information types supported by the external data service, at 620. The automatic mapping can include associating the lookup information types supported with the columns in the user data. At 630, external data from the service is transferred to the user spreadsheet environment, which can be based on the mapping. For example, the user data can be augmented with the data from the external data source, one or more columns can be updated, or other actions can be performed (e.g., potential obsolete data in one or more columns can be identified). The external data does not always result in user data updates. However, the user data will be previewed in some manner by the user.

Figure 7:
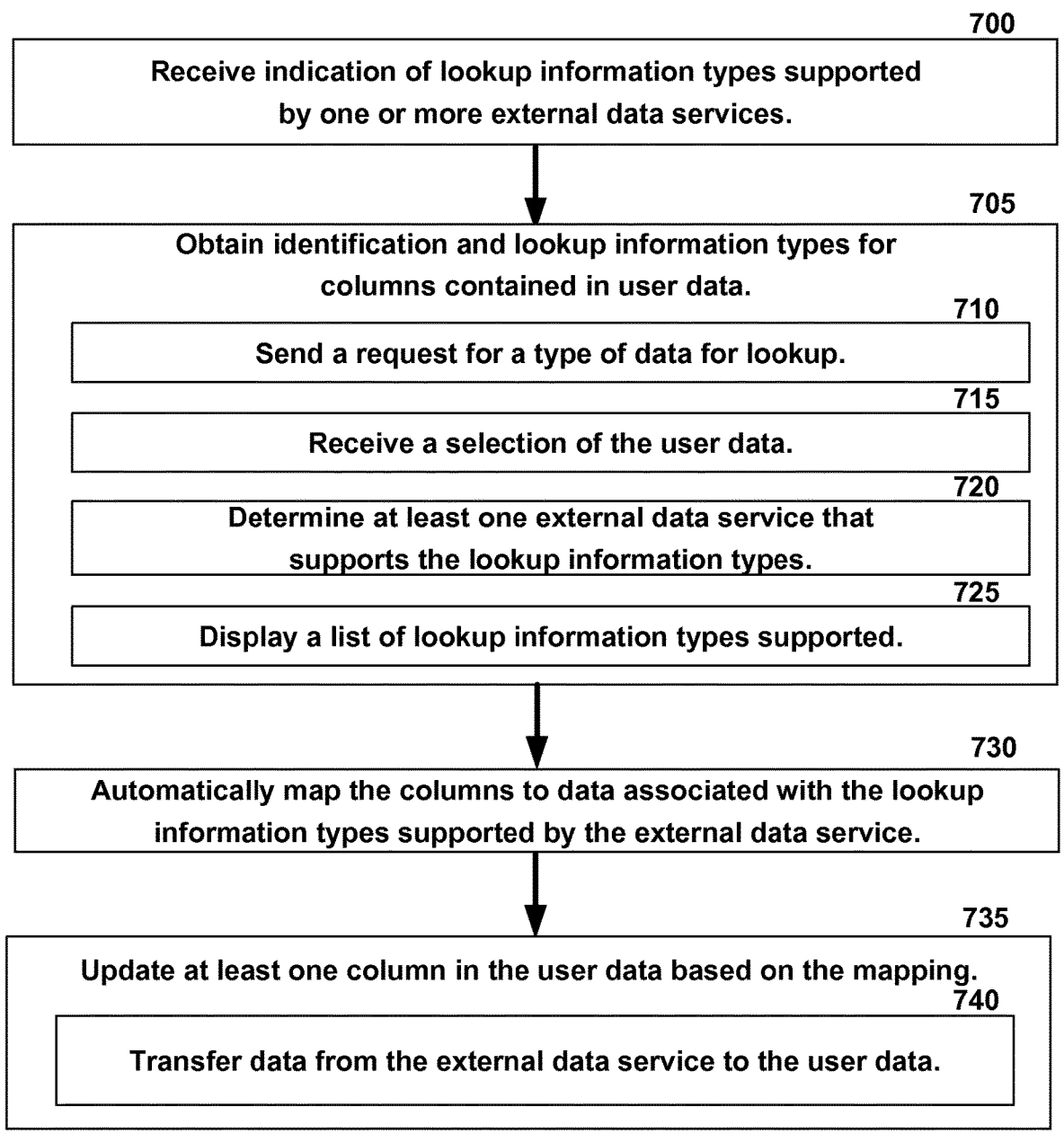
FIG. 7 illustrates a non-limiting flow diagram for spreadsheet-based data classification for source target mapping, according to an aspect.

FIG. 7 illustrates a non-limiting flow diagram for spreadsheet-based data classification for source target mapping, according to an aspect. At 700, an indication of lookup information types supported by one or more external data sources is received. At 705, identification and lookup information types for columns contained in user data is obtained. According to an aspect, obtaining the identification and lookup information types includes, at 710, sending a request for a type of data for lookup. For example, the request can be sent as a prompt displayed in a spreadsheet program. At 715, a selection of the user data is received and at least one external data service that supports the lookup information types is determined, at 720. The determination can be made based on accessing a data store that contains information related to the external data services that support the lookup information types. At 725, a list of lookup information types supported is displayed.

At 730, the columns are automatically mapped to data associated with the lookup information types supported by the external data service. At least one column in the user data is updated, at 735, based on the mapping. In accordance with some aspects, the updating includes transferring data from the external data service to the user data, at 740. In an aspect, transferring the data includes deleting duplicate data. In another aspect, transferring the data includes performing a union or a join on the transferred data and a user data. According to another aspect, transferring the data includes automatically applying value and entity matching during the data transfer. Yet in another aspect, transferring the data includes identifying data contained in the user data but not contained in the transferred data. The identified data can be flagged or identified for further analysis.

Figure 8:
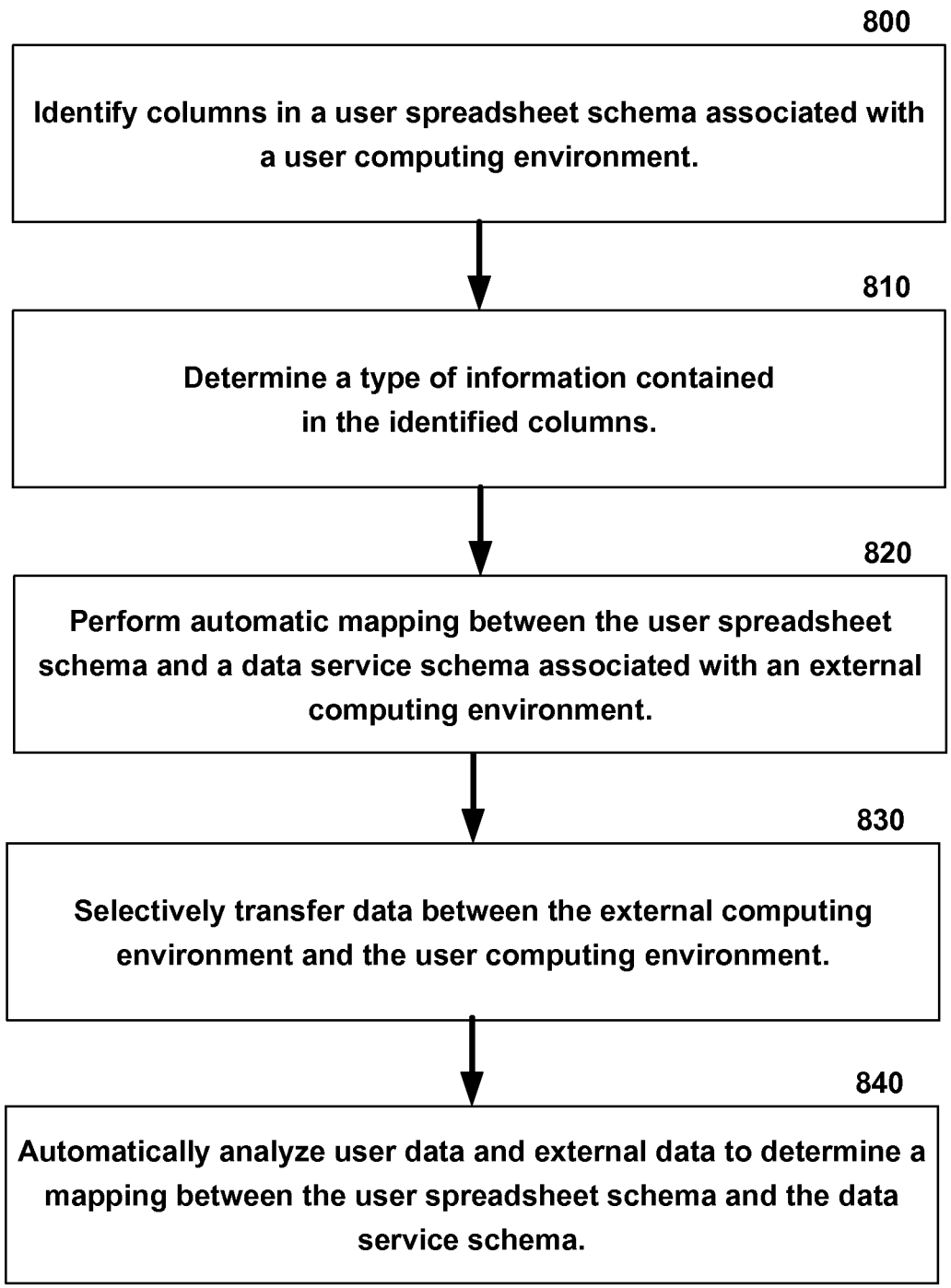
FIG. 8 illustrates a non-limiting flow diagram for automatic mapping, according to an aspect.

FIG. 8 illustrates a non-limiting flow diagram for automatic mapping, according to an aspect. At 800, columns in a user spreadsheet schema associated with a user computing environment are identified. A type of information contained in the identified columns is determined, at 810. The determination can be made based on a user input and/or based on automatic analysis of the columns. At 820, automatic mapping between the user spreadsheet schema and a data service schema associated with an external computing environment is performed. At 830, data is selectively transferred between the external computing environment and the user computing environment. In accordance with some aspects, at 840, user data and external data is automatically analyzed to determine a mapping between the user spreadsheet schema and the data service schema.

As discussed herein, the various aspects are configured to introduce the notion of well-known domains that contain standard types of information. External data sets can be mapped or marked up to classify their attributes into these standard information types. Within a spreadsheet application, a user can classify attributes of their spreadsheet-based data sets. The classification allows automatic processes to be performed, such as automatic corresponding external data source and data set detection, spreadsheet data set to external data set unions and joins, automatic value and entity matching, and information transfers to improve the quality of the spreadsheet based data set.

Exemplary Networked and Distributed Environments

One of ordinary skill in the art can appreciate that the various embodiments of the spreadsheet program-based data classification for source target mapping systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects, or resources that may participate in the access control and execution mechanisms as described for various embodiments of the subject disclosure.

Figure 9:
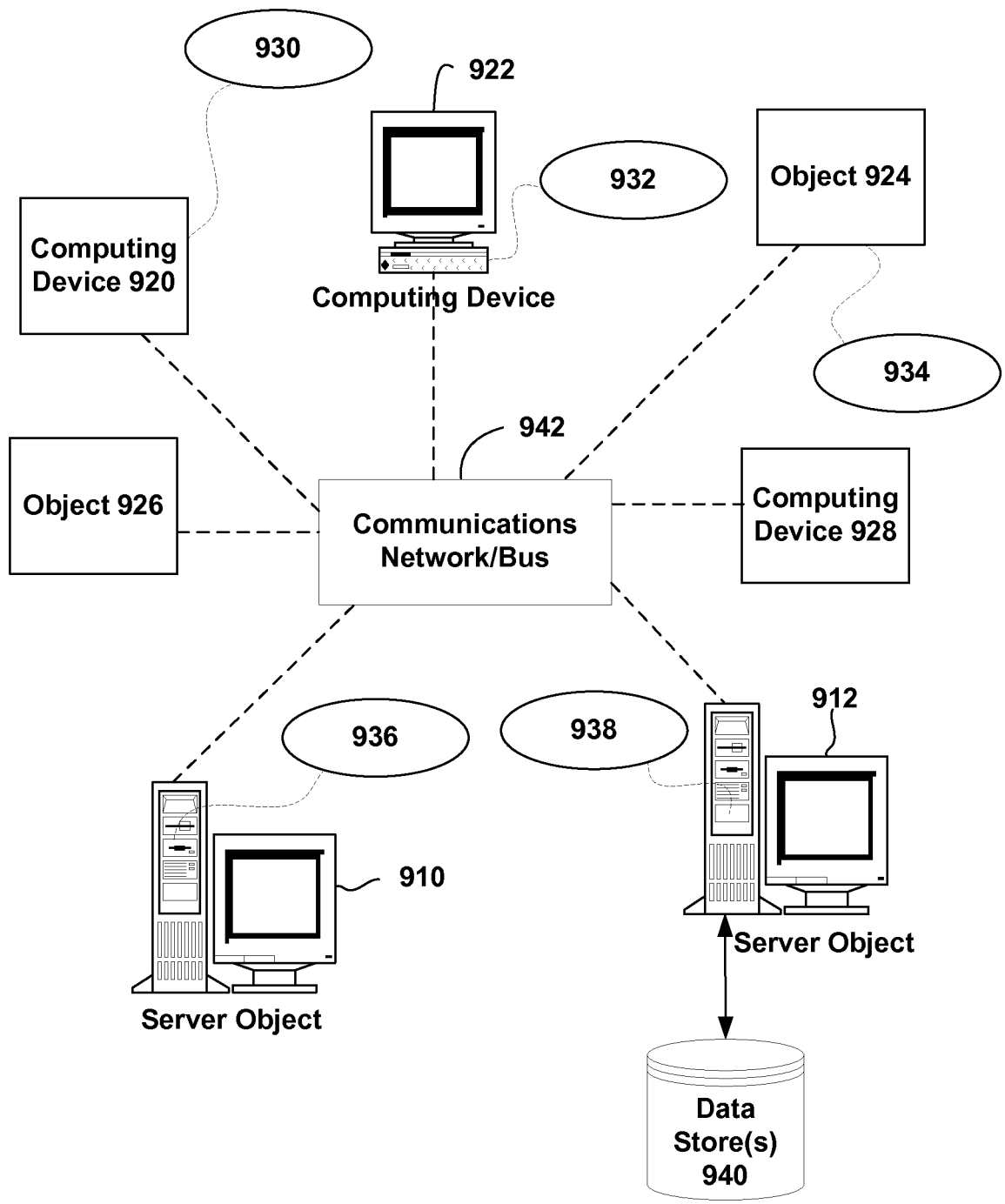
FIG. 9 is a block diagram representing exemplary non-limiting networked environments in which various embodiments described herein can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938 and data store(s) 940. It can be appreciated that computing objects 910, 912, etc. and computing objects or devices 920, 922, 924, 926, 928, etc. may comprise different devices, such as personal digital assistants (PDAs), audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 942, either directly or indirectly. Even though illustrated as a single element in FIG. 9, communications network 942 may comprise other computing objects and computing devices that provide services to the system of FIG. 9, and/or may represent multiple interconnected networks, which are not shown. Each computing object 910, 912, etc. or computing object or devices 920, 922, 924, 926, 928, etc. can also contain an application, such as applications 930, 932, 934, 936, 938, that might make use of an API, or other object, software, firmware and/or hardware, suitable for communication with or implementation of the access control and management techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, although any network infrastructure can be used for exemplary communications made incident to the access control management systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc., acting as servers provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 942 or bus is the Internet, for example, the computing objects 910, 912, etc. can be Web servers with which other computing objects or devices 920, 922, 924, 926, 928, etc. communicate via any of a number of known protocols, such as the hypertext transfer protocol (HTTP). Computing objects 910, 912, etc. acting as servers may also serve as clients, e.g., computing objects or devices 920, 922, 924, 926, 928, etc., as may be characteristic of a distributed computing environment.

Exemplary Computing Device

As mentioned, advantageously, the techniques described herein can be applied to any device where it is desirable to perform service schema matching or third party cloud schema matching in a computing system. It can be understood, therefore, that handheld, portable and other computing devices and computing objects of all kinds are contemplated for use in connection with the various embodiments, i.e., anywhere that resource usage of a device may be desirably enhanced. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 10:
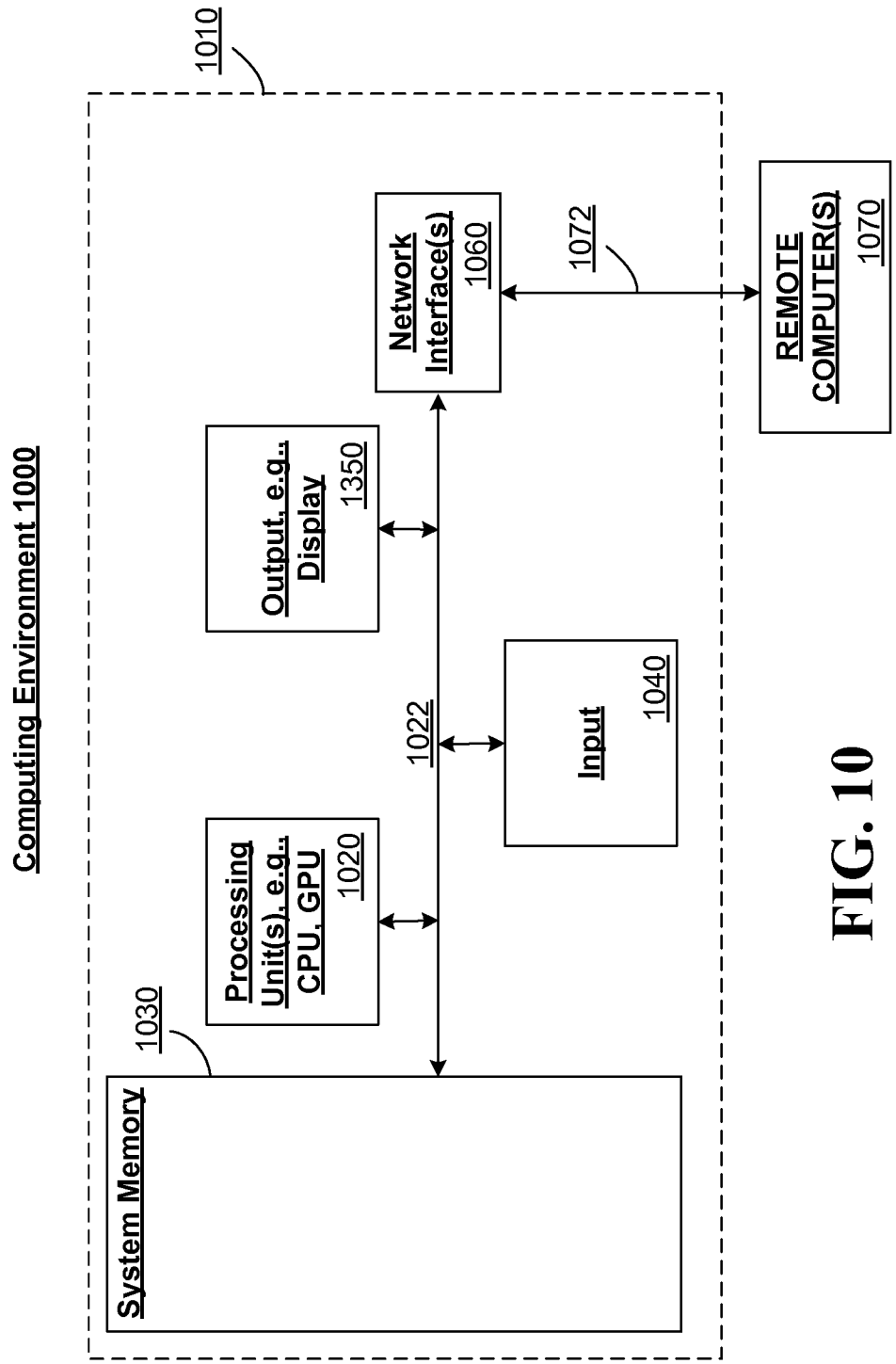
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither should the computing system environment 1000 be interpreted as having any dependency or requirement relating to any one or combination of components illustrated in the exemplary computing system environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1310 typically includes a variety of computer readable media and can be any available media that can be accessed by computer 1310. The system memory 1330 may include computer storage media. Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections, such as network interfaces 1060, to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method, comprising:
receiving a user selection of types of data to lookup;
determining an external data service that supports the types of data to lookup;
receiving an indication of lookup information types supported by the external data service;
displaying to a user a list of lookup information types supported by the external data service;
obtaining identification and lookup information types for schemas that describe organization of data contained in user data based at least in part upon user selection, the identification comprises schemas in a user spreadsheet environment for which data is desired from the external data source, the lookup information types comprising a cross-reference between the identified schemas and lookup information types supported by the external data source;
automatically mapping the identified schemas to data associated with the lookup information types supported by the external data service by analyzing the identified schemas and the data associated with the lookup information types supported by the external data service to determine how the data associated with the lookup information types supported by the external data service map to identified schemas, the mapping being initiated automatically without user activation; and
transferring external data from the external data service to the user spreadsheet environment based on the mapping.

2. The method of claim 1, wherein the mapping comprises at least one of one-to-one schema mapping and one-to-many schema mapping.

3. The method of claim 1, wherein the transferring comprises deleting duplicate data.

4. The method of claim 1, wherein the transferring comprises performing a union or a join on the transferred data and the user data.

5. The method of claim 1, wherein the transferring comprises applying value and entity matching during the data transfer.

6. The method of claim 1, further comprising identifying data contained in the user data but not contained in the transferred data.

7. The method of claim 1, wherein the data contained in the user data comprises columns and rows of a spreadsheet.

8. A method, comprising:
receiving an indication of lookup information types supported by an external data service;
inferring identification and lookup information types for data contained in user data based at least in part upon user selection, the identification comprises data in a user computing environment for which data is desired from the external data source, the lookup information types comprising a cross-reference between the identified data and lookup information types supported by the external data source;
automatically mapping the identified data to data associated with the lookup information types supported by the external data service by analyzing the identified data and the data associated with the lookup information types supported by the external data service to determine how the data associated with the lookup information types supported by the external data service map to the identified data, the mapping being initiated automatically without user activation; and
transferring external data from the external data service to the user computing environment based on the mapping.

9. The method of claim 8, wherein the data contained in user data comprise columns of a spreadsheet.

10. The method of claim 9, wherein the data contained in user data comprise rows of a spreadsheet.

11. The method of claim 8, wherein the mapping comprises at least one of one-to-one schema mapping and one-to-many schema mapping.

12. The method of claim 8, wherein the transferring comprises deleting duplicate data.

13. The method of claim 8, wherein the transferring comprises performing a union or a join on the transferred data and the user data.

14. The method of claim 8, wherein the transferring comprises applying value and entity matching during the data transfer.

15. A system, comprising:
a computer comprising:
a mapping manager component configured to receive an indication of lookup information types supported by an external data service, the mapping manager further configured to infer identification and lookup information types for data contained in user data based at least in part upon user selection, the identification comprises data in a user computing environment for which data is desired from the external data source, the lookup information types comprising a cross-reference between the identified data and lookup information types supported by the external data source; the mapping manager further configured to automatically map the identified data to data associated with the lookup information types supported by the external data service by analyzing the identified data and the data associated with the lookup information types supported by the external data service to determine how the data associated with the lookup information types supported by the external data service map to the identified data, the map being initiated automatically without user activation; and a revision component configured to transfer external data from the external data service to the user computing environment based on the map.

16. The system of claim 15, wherein the mapping comprises at least one of one-to-one schema mapping and one-to-many schema mapping.

17. The system of claim 15, wherein the transferring comprises deleting duplicate data.

18. The system of claim 15, wherein the transferring comprises performing a union or a join on the transferred data and the user data.

19. The system of claim 15, wherein the transferring comprises applying value and entity matching during the data transfer.

20. The system of claim 15, wherein the data contained in the user data comprises columns and rows of a spreadsheet.

* * * * *